(12) United States Patent
Shankar et al.

(10) Patent No.: US 9,128,754 B2
(45) Date of Patent: Sep. 8, 2015

(54) RESOURCE STARVATION MANAGEMENT IN A COMPUTER SYSTEM

(75) Inventors: Ganesh Handige Shankar, Bangalore Karnataka (IN); John R. Reilly, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 469 days.

(21) Appl. No.: 13/484,464

(22) Filed: May 31, 2012

(65) Prior Publication Data

US 2013/0326528 A1 Dec. 5, 2013

(51) Int. Cl.
*G06F 9/46* (2006.01)
*G06F 9/48* (2006.01)

(52) U.S. Cl.
CPC ............ *G06F 9/4881* (2013.01); *G06F 9/4843* (2013.01)

(58) Field of Classification Search
None
See application file for complete search history.

(56) References Cited

U.S. PATENT DOCUMENTS

| | | | | |
|---|---|---|---|---|
| 5,944,778 | A * | 8/1999 | Takeuchi et al. | 718/100 |
| 6,088,751 | A * | 7/2000 | Jaramillo | 710/116 |
| 6,108,683 | A * | 8/2000 | Kamada et al. | 718/103 |
| 7,137,019 | B2 * | 11/2006 | Hellerstein et al. | 713/323 |
| 7,383,548 | B2 * | 6/2008 | Boon et al. | 718/102 |
| 7,451,447 | B1 | 11/2008 | Deshpande | |
| 7,984,447 | B1 | 7/2011 | Markov et al. | |
| 2004/0210695 | A1 * | 10/2004 | Weber et al. | 710/240 |
| 2005/0076337 | A1 * | 4/2005 | Mangan | 718/100 |
| 2006/0037025 | A1 * | 2/2006 | Janssen et al. | 718/107 |
| 2006/0265713 | A1 * | 11/2006 | Depro et al. | 718/104 |
| 2008/0313639 | A1 * | 12/2008 | Kumar et al. | 718/104 |
| 2010/0070977 | A1 * | 3/2010 | Fortsch et al. | 718/103 |
| 2010/0257530 | A1 * | 10/2010 | Brenneman et al. | 718/102 |
| 2012/0076152 | A1 | 3/2012 | Mansharamani | |

FOREIGN PATENT DOCUMENTS

CN 101499019 A 8/2009

OTHER PUBLICATIONS

Viehl, Alexander, et al., White Box Performance Analysis Considering Static Non-Preemptive Software Scheduling, FZI Forschungszentrum Inf., Karlsruhe, Apr. 20-24, 2009, pp. 513-518.< http://ieeexplore.ieee.org/stamp/stamp.jsp?arnumber=5090718 >.
Whitepaper / Advanced Course Reading Assignment: New Directions in RTOS Kernels, D. Kalinsky Associates, download date: May 31, 2012. < http://www.kalinskyassociates.com/Wpaper7.html >.

* cited by examiner

*Primary Examiner* — Abdullah Al Kawsar
(74) *Attorney, Agent, or Firm* — Hewlett-Packard Patent Department

(57) ABSTRACT

Provided is a method of managing resource starvation in a computer system. A highest priority task is created in a computer system. The highest priority task identifies a resource starvation causing task in the computer system and reduces current priority of the starvation causing task.

10 Claims, 4 Drawing Sheets

RESOURCE STARVATION MANAGEMENT IN A COMPUTER SYSTEM

BACKGROUND

In a typical computer system, a central processing unit (CPU) is responsible for executing tasks of various kinds. If there is more than one task that is ready for execution, it is the operating system that determines in what order the tasks would be executed. The portion of the operating system that decides the task to be executed is known as the scheduler. The scheduler is typically responsible for determining the priority or importance of each task and scheduling their execution by a processor based on priority.

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Figure 1:
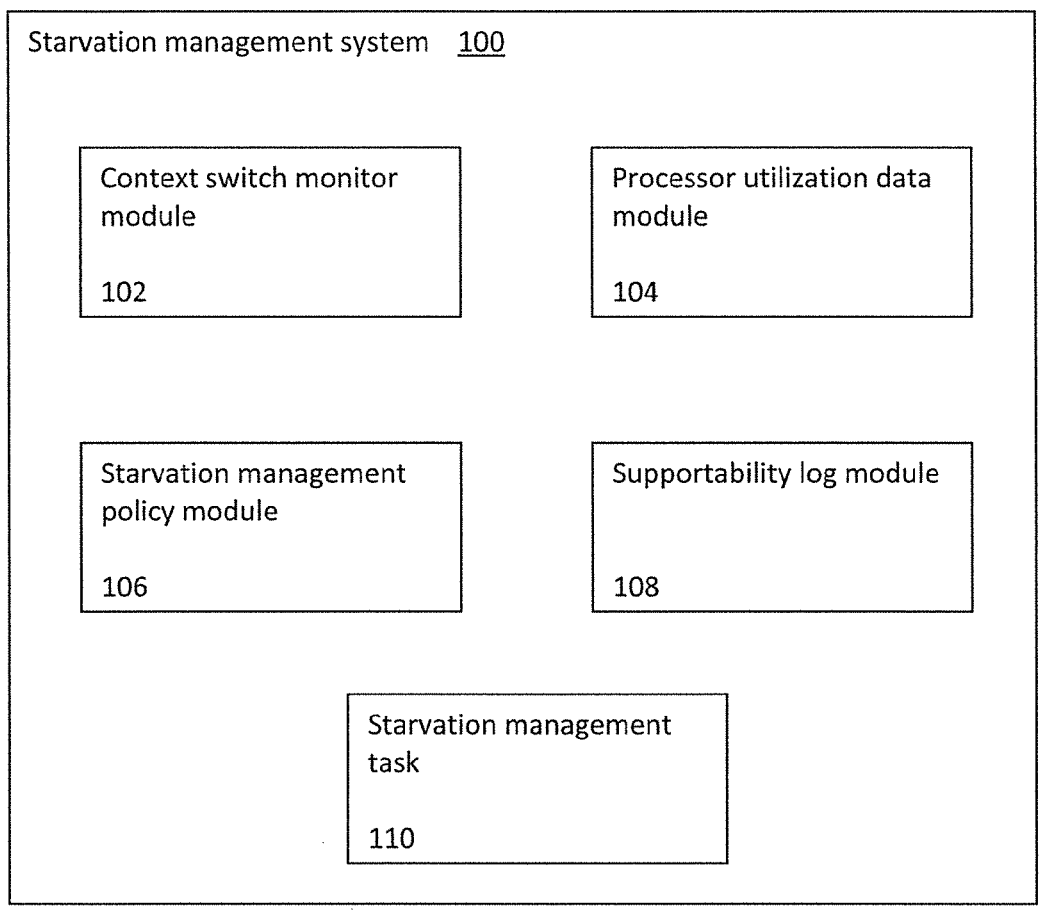
FIG. 1 shows a block diagram of a resource starvation management system, according to an example.

In a typical computer system, a task scheduler may be responsible for determining the order of tasks that are waiting to be executed by a processor. In one mechanism, if there is more than one task waiting to execute, the task scheduler may divide the total processor time available on a processing unit among the various tasks. This is typically known as a round robin scheduling policy or time division multiplexing (TDM).

In another mechanism, a task scheduler may use a fixed priority preemptive scheduling system. Under this approach, a scheduler ensures that at any given time, the processor executes the highest priority task of all those tasks that are ready for execution. A fixed priority preemptive scheduling system is based on the policy of prioritized computation. In other words, from the set of tasks that are ready the task with the highest priority should always be the one currently using the processor. If a task with a higher priority becomes ready for execution, execution of the current task on the processor is suspended and execution of the higher priority task is begun or resumed. The previously executing task is returned to the ready task list until it is once again the highest-priority task in the system.

Task scheduling methods such as fixed priority preemptive scheduling are prone to resource starvation issues if any of the tasks in the system use the processor for an excessive time. For instance, a higher priority task may take a long time to complete before yielding the processor to other tasks of lower priority. If a higher priority task does not reach completion of its current activities and yield then the tasks having lower priority may be starved. Resource starvation occurs when one or more tasks of lower priority are perpetually denied necessary resources (for instance, processor time, memory, input/output device access, etc.) required for its completion.

Generally, it is the system designers who have the responsibility to ensure that tasks are designed and implemented to properly co-operate and yield control to lower priority tasks. Such a mandate on the system designers is reasonable when there are few tasks and there is a tighter control over the total design of the system. However, as systems increase in size and complexity, it becomes difficult to ensure proper co-operation among a large number of tasks to effectively manage resource starvation.

It is possible that in a system designed for a fixed priority preemptive scheduling policy, a system designer may need to include software (machine readable instructions) that was designed for other scheduling policies, including but not limited to round robin scheduling. In such cases, integration of code with these different scheduling polices may result in resource starvation. In an example, the addition of many public domain software implementations into a fixed priority preemptive scheduling design can lead to such an integration issue, because most of the public domain code is designed for round robin scheduling policy.

In the aforementioned example scenarios, there is no mechanism to automatically detect resource starvation and if the starvation continues for more than a predefined time trigger resource starvation mitigation.

Proposed is a resource starvation management approach applied during a task scheduling process. The proposed approach is able to use existing task scheduling mechanisms (for example, fixed priority based preemptive scheduling) for managing resource starvation. The proposed approach can handle resource starvation caused due to poorly designed or written code and code ported from designs which do not account for differences between fixed priority preemptive and other scheduling policies (for example round robin).

For the sake of clarity, the term "task" may include a process, program, function, application, thread, routine, an instruction, or the like that is executable by a processing unit.

FIG. 1 shows a block diagram of a resource starvation management system, according to an example. Resource starvation management system 100 illustrated in FIG. 1 includes context switch monitor module 102, processor utilization data module 104, starvation management policy module 106, supportability log module 108, and starvation management task 110. In some examples, resource starvation management system 100 may include additional or less modules than those illustrated in FIG. 1.

For the sake of clarity, the term "module", as used in this document, may mean to include a software component, a hardware component or a combination thereof. A module may include, by way of example, components, such as software components, processes, tasks, co-routines, functions, attributes, procedures, drivers, firmware, data, databases, data structures, Application Specific Integrated Circuits (ASIC) and other computing devices. The module may reside on a volatile or non-volatile storage medium and configured to interact with a processor of a computer system.

Context switch monitor module 102 collects processor usage data of each task in a computer system. Each task in a system has its own context, which is the CPU environment and system resources provided by the operating system for the task each time it is scheduled to run by the scheduler of the operating system. Context switching is the process of transferring execution control from one task to another. In simple terms, it means pausing one task to start another task.

In an example, context switching is managed by a scheduler unit of the operating system. The scheduler may use the context switch monitor module 102 to measure processor usage data of each task in the system. For this purpose, the scheduler may update the context switch monitor module 102 when a context switch is performed. The context switch monitor module 102 is updated by the scheduler on every context switch of a task in the system. The context switch monitor module 102 may be updated with multiple parameters. It could be updated by a task identifier unique to the task that is being scheduled out and a task identifier unique to the task that is being scheduled in. This information along with the current system time is used to build the processor utilization data module 104 of each task that is running in the system.

Starvation management policy module 106 contains information on how often CPU utilization of all tasks in the system need to be examined by starvation management task 110 in order to identify tasks that cause resource starvation. In other words, how frequently starvation causing tasks should be identified in a computer system is defined in the policy module. Starvation management policy module 106 may also contain information related to a threshold CPU utilization value for a task to trigger priority management. The threshold CPU utilization may be the same for all the tasks or it may vary among the tasks.

For the sake of clarity, all values, limits, rules and the like contained in the starvation policy module 106 may be user defined.

Starvation management task 110 periodically checks the information in the processor utilization data module 104 to determine if a task exceeds its predetermined threshold CPU utilization value. If the CPU utilization value is exceeded priority management would be triggered for that task. Priority management changes the priority of a task according to the time it has been causing other tasks to wait in the ready queue or how many resources the task is consuming. Priority management is used to reduce resource starvation of lower priority tasks and to ensure that they will eventually complete their execution.

For the sake of clarity, the term "user" may include the system designer, system administrator, the user of the system, or other parties, including but not limited to other computing systems.

Starvation management policy module 106 may additionally contain an excessive resource usage time limit for each task in the system. If a task that has been subjected to priority management ceases excessive resource demands within the specified excessive resource usage time limit assigned to it, it may no longer be subject to priority management. The excessive resource usage time limit may be the same for all the tasks or it may vary among the tasks.

Starvation management policy module 106 may also contain supportability related parameters such as whether to enable or disable logging information about priority management actions. The supportability related parameters may be the same for all the tasks or it may vary among the tasks.

Supportability log module 108 may contain information related to tasks that do not recover within excessive usage resource time limit. A user could use information in the supportability log module 108 to take corrective action.

Figure 2:
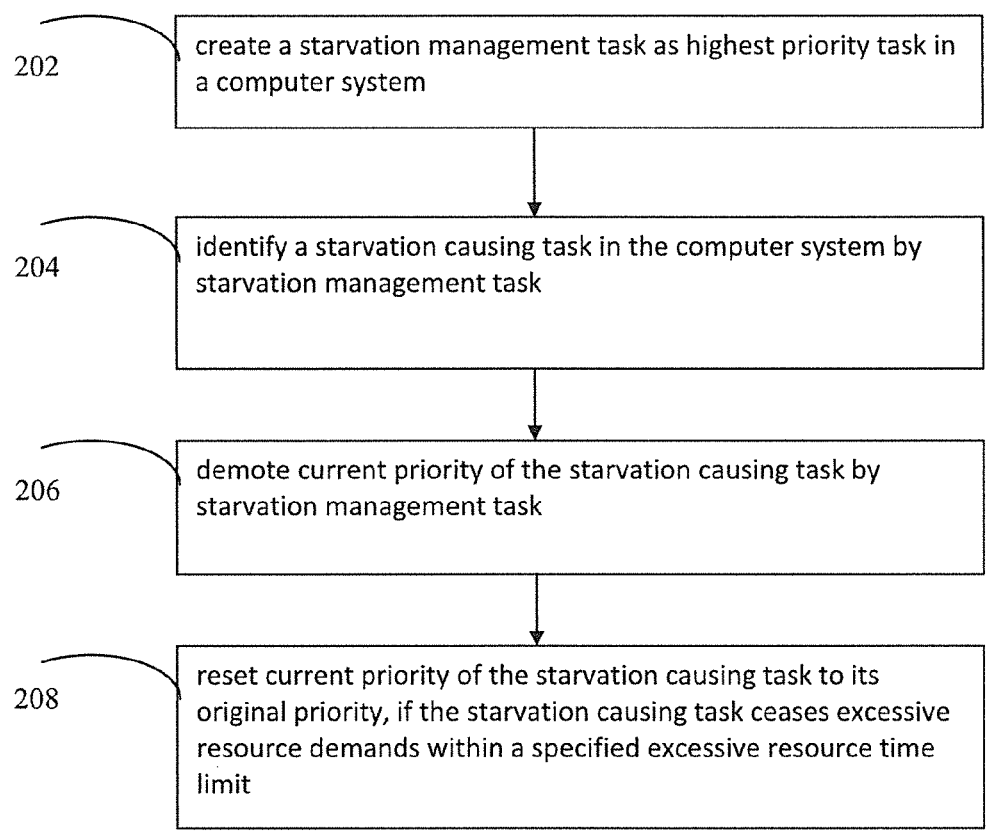
FIG. 2 shows a flowchart of a method of managing resource starvation in a computer system, according to an example.

FIG. 2 shows a flowchart of a method of managing resource starvation, according to an example.

At block 202, the starvation management task 110 is created in a system and is assigned highest priority amongst all tasks present in the system. In an example, such task is created by a user of the system. The starvation management task 110 is assigned the responsibility of monitoring CPU usage data of the rest of the tasks in the system. The CPU utilization data of each task is collected using context switch monitor module 102. In an example, the context switch monitor module 102 is updated by an operating system scheduler on every context switch of a task in the system.

At block 204, the starvation management task 110 identifies tasks that are causing starvation in the system. The starvation management task identifies such tasks by reading the CPU utilization data from the processor utilization data module 104. In an example, the starvation management task identifies starvation causing tasks by periodically reading the CPU utilization data. The periodicity of reading the CPU utilization data could be determined by a user and it may be defined in the form of a starvation management policy. The starvation management policy may be stored in a starvation management policy module 106.

Figure 3:
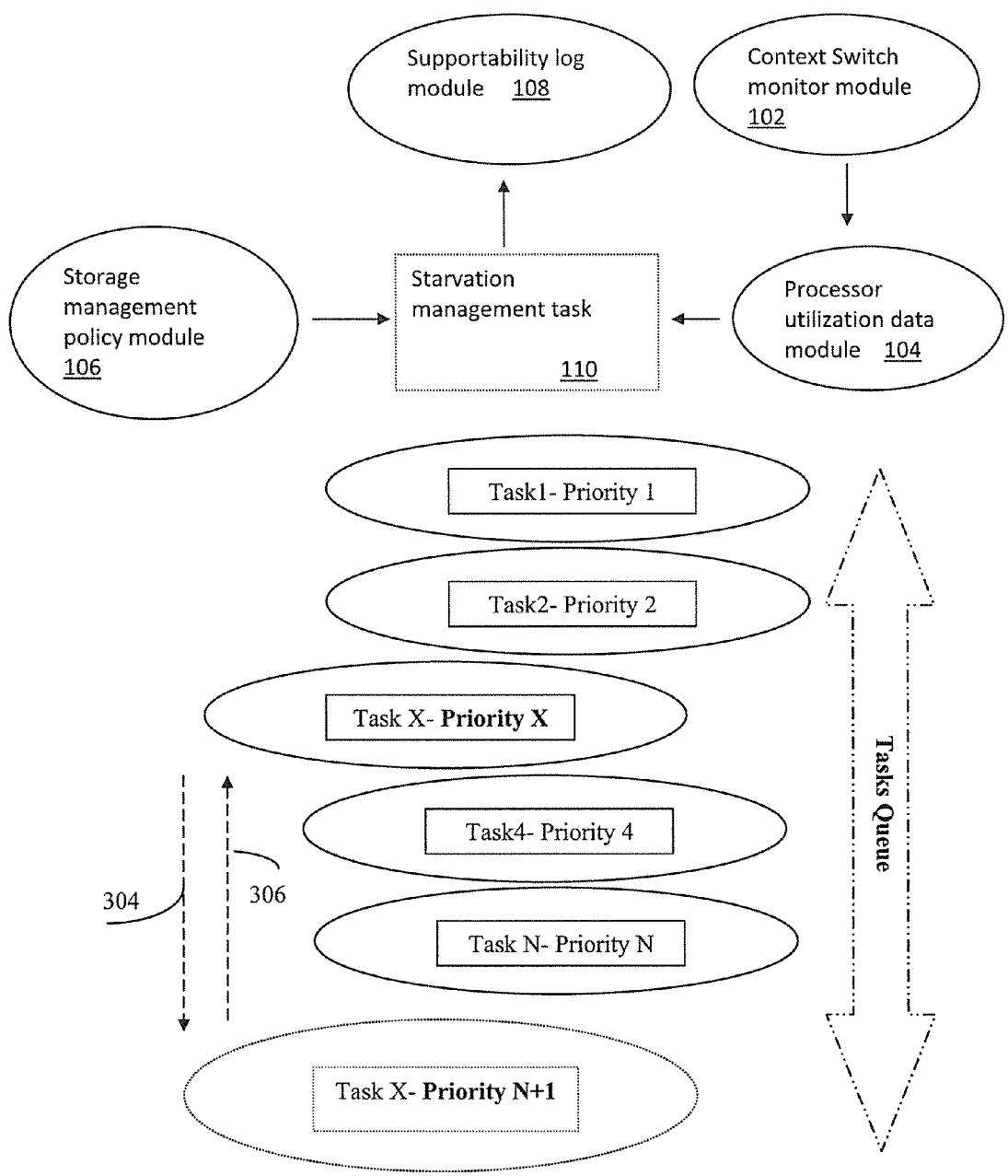
FIG. 3 illustrates an implementation of a resource starvation management system, according to an example.

At block 206, if a starvation causing task is identified in the system, the starvation management task lowers the current priority of the starvation causing task to one level below the lowest priority task in the system. To provide an example (illustrated in FIG. 3), if a Task "X" having Priority "X" causes starvation then the starvation management task 110 may provisionally lower its priority to one below the lowest priority task in the system. Referring to FIG. 3, it is shown that a series of tasks (Task 1, Task 2, Task "X", Task 4, . . . , Task "N") are in the queue ready for execution. Each of these tasks (Task 1, Task 2, Task "X", Task 4, . . . , Task "N") has a given priority (Priority 1, Priority 2, Priority "X", Priority 4, . . . , Priority "N") respectively. The starvation management task identifies (from the CPU utilization data) that Task "X" is causing starvation of resources (for example, processor time) in the system. Once identified, the starvation management task provisionally lowers the priority of such task to one below the lowest priority task in the system. In the present case, the priority of such task "X" is set to N+1 (Priority 1 being highest and Priority N+1 being the lowest). The aforementioned process is termed "priority demotion" 304.

For the sake of clarity, a task that has been subjected to priority demotion 304 is no longer considered a starvation causing task. It is however still considered to be attempting to consume excessive resources (for example CPU). Such a task must remain subject to priority demotion until it ceases its excessive resource demands, or is dealt with by other means.

In some implementations, if a priority demoted task ceases excessive resource demands within a specified excessive resource usage time limit, then the starvation management task may reset priority of such task (block 208) to its original priority i.e. Priority "X" in this case. This process is termed "priority reversal" 306.

In some implementations, if the starvation causing task continues excessive resource demands beyond the excessive resource usage time limit other actions may be triggered based on the starvation management policy in the starvation management policy module 106. For example, the starvation causing task may be restarted. In another example, a critical warning may be logged in the supportability log 108. In a yet another example, a management action may be initiated.

Figure 4:
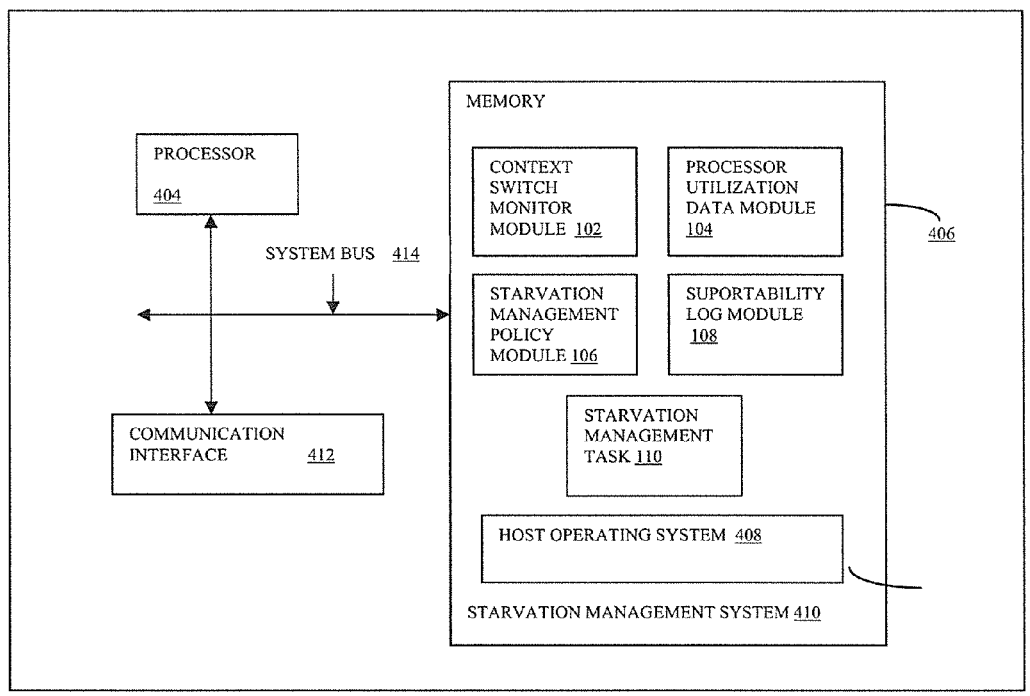
FIG. 4 shows a block diagram of a resource starvation management system hosted on a computer system, according to an example.

FIG. 4 shows a block diagram of a resource starvation management system hosted on a computer system, according to an example.

Computer system 402 may be a network switch, router, desktop computer, notebook computer, tablet computer, computer server, mobile phone, personal digital assistant (PDA), or the like.

Computer system 402 may include processor 404, memory 406, host operating system 408, starvation management system 410 and a communication interface 412. Starvation management system 410 includes context switch monitor module 416, processor utilization data module 418, starvation management policy module 420, supportability log module 422 and starvation management task 424. The components of the computing system 402 may be coupled together through a system bus 414.

Processor 404 may include any type of processor, microprocessor, or processing logic that interprets and executes instructions.

Memory 406 may include a random access memory (RAM) or another type of dynamic storage device that may store information and instructions non-transitorily for execution by processor 404. For example, memory 406 can be SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. Memory 406 may include instructions that when executed by processor 404 implement host operating system 408 and starvation management system 410.

Communication interface 412 may include any transceiver-like mechanism that enables computing device 402 to communicate with other devices and/or systems via a communication link. Communication interface 412 may be a software program, a hard ware, a firmware, or any combination thereof. Communication interface 412 may use a variety of communication technologies to enable communication between computer system 402 and another computer system or device. To provide a few non-limiting examples, communication interface 412 may be an Ethernet card, a modem, an integrated services digital network ("ISDN") card, etc.

Starvation management system 410 may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

In an implementation, starvation management system 410 may be read into memory 406 from another computer-readable medium, such as data storage device, or from another device via communication interface 412.

It would be appreciated that the system components depicted in FIG. 4 are for the purpose of illustration only and the actual components may vary depending on the computing system and architecture deployed for implementation of the present solution. The various components described above may be hosted on a single computing system or multiple computer systems, including servers, connected together through suitable means.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A method of managing resource starvation in a computer system, comprising:
    creating a starvation management task in the computer system, wherein the starvation management task is assigned a highest priority;
    identifying, by the starvation management task, a starvation causing task in the computer system;
    demoting a current priority of the starvation causing task, by the starvation management task, to a priority less than a lowest priority task in the computer system;
    resetting the priority of the starvation causing task to a higher priority if the starvation causing task ceases excessive resource demands within a predetermined excessive resource usage time limit; and
    generating a system event if the starvation causing task continues excessive resource demands after the demotion and beyond the predetermined excessive resource usage time limit.

2. The method of claim 1, wherein the current priority of the starvation causing task is reduced one level below the lowest priority task in the computer system.

3. The method of claim 1, wherein the starvation management task identifies a starvation causing task by monitoring processor utilization data of all tasks in the computer system.

4. A resource starvation management system, comprising:
    a context switch monitor module to collect processor usage data of tasks in a computer system, and to provide the processor usage data of tasks to a starvation management task, wherein the starvation management task is assigned a highest priority in the computer system;
    a starvation management policy module to store user defined policy details; and
    a processor to implement the starvation management task, the context switch monitor module, and the starvation management policy module,
    wherein the starvation management task is to
    identify a starvation causing task in the computer system,
    demote a current priority of the starvation causing task to a priority less than a lowest priority task in the computer system, based on the user defined policy details in the starvation management policy module,
    reset the priority of the starvation causing task to a higher priority if the starvation causing task ceases excessive resource demands within a predetermined excessive resource usage time limit; and
    generate a system event if the starvation causing task continues excessive resource demands after the demotion and beyond the predetermined excessive resource usage time limit.

5. The system of claim 4, wherein the user defined policy details include a threshold processor utilization value for a task to trigger a priority demotion, excessive resource usage time limit for a task, and/or a frequency of identifying starvation causing tasks in the computer system.

6. The system of claim 4, further comprising a processor utilization data module to store the processor usage data of the tasks in the computer system.

7. The system of claim 6, wherein the starvation management task refers to the processor utilization data module to identify starvation causing tasks in the computer system.

8. The system of claim 4, further comprising a supportability log module to store information related to tasks that do not recover within an excessive resource usage time limit.

9. The system of claim 4, wherein the computer system is a network switch or router.

10. A non-transitory computer readable medium, the non-transitory computer readable medium comprising machine executable instructions, the machine executable instructions when executed by a computer system cause the computer system to:
- create a starvation management task in the computer system, wherein the starvation management task is assigned a highest priority;
- identify a starvation causing task in the computer system with the starvation management task;
- demote a current priority of the starvation causing task to a priority less than a lowest priority task in the computer system;
- reset the priority of the starvation causing task to a higher priority if the starvation causing task ceases excessive resource demands within a predetermined excessive resource usage time limit; and
- generate a system event if the starvation causing task continues excessive resource demands after the demotion and beyond the predetermined excessive resource usage time limit.

* * * * *